US008159537B2

(12) United States Patent
Itoh et al.

(10) Patent No.: US 8,159,537 B2
(45) Date of Patent: Apr. 17, 2012

(54) VIDEO SURVEILLANCE EQUIPMENT AND VIDEO SURVEILLANCE SYSTEM

(75) Inventors: Masaya Itoh, Hitachi (JP); Eiji Moro, Totsuka (JP); Hiromasa Fujii, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1286 days.

(21) Appl. No.: 11/836,197

(22) Filed: Aug. 9, 2007

(65) Prior Publication Data

US 2008/0158361 A1 Jul. 3, 2008

(30) Foreign Application Priority Data

Oct. 23, 2006 (JP) ................................ 2006-287087

(51) Int. Cl.
*H04N 7/18* (2006.01)

(52) U.S. Cl. .................. 348/155; 348/E7.085; 348/152; 348/153

(58) Field of Classification Search ........... 348/143–160
See application file for complete search history.

(56) References Cited

U.S. PATENT DOCUMENTS 7,847,675 B1 * 12/2010 Thyen et al. .................. 340/5.2
2002/0163577 A1 * 11/2002 Myers .......................... 348/152

FOREIGN PATENT DOCUMENTS

JP 10-285586 10/1998

* cited by examiner

*Primary Examiner* — Quang N. Nguyen
*Assistant Examiner* — Andrew Woo
(74) *Attorney, Agent, or Firm* — Antonelli, Terry, Stout & Kraus, LLP.

(57) ABSTRACT

A video surveillance equipment for detecting a change of an object in a monitoring area based on input images captured by an image capturing device, the equipment comprising:

- an area detection apparatus for detecting a second image area being stationary for a predetermined time in a first image area which is an area differing between a reference image used as a reference in image processing and the input images;
- a memory apparatus for storing image of the detected second image area; and
- an image comparison apparatus for performing comparison processing a plurality of times between the stored image and image in the second image area included in the input images.

7 Claims, 7 Drawing Sheets

VIDEO SURVEILLANCE EQUIPMENT AND VIDEO SURVEILLANCE SYSTEM

CLAIM OF PRIORITY

The present application claims priority from Japanese application serial no. 2006-287087, filed on Oct. 23, 2006, the content of which is hereby incorporated by reference into this application.

BACKGROUND OF THE INVENTION

The present invention relates to a video surveillance equipment having functions for capturing pictures from an imaging apparatus such as a camera and detecting abnormalities and the like in a monitoring area by image recognition.

A video surveillance equipment having a function for detecting moving object that appear in a monitoring area by image recognition, such as persons and vehicles and the like can record only pictures on which a moving object appears by using detection results, and can call observer's attention by displaying warning icons on a display section or making a buzzer or the like sound. Accordingly, this type of video surveillance equipment is useful for reducing the burden for monitoring jobs in which confirmation has been needed at all times.

The above video surveillance equipment uses a known method of detecting changes in persons' motion and the like on pictures by comparing input images with a background image prepared in advance. In generally, this method is called the image subtraction method. The image subtraction method is used in many video surveillance equipment because the computational cost in the method is relatively low.

To detect a state in which a dangerous object or the like is left, a method of not only detecting changes on pictures but also recognizing, as a left object, an area in which changes from the background image are consecutively detected is disclosed in, for example Japanese Patent Laid-open No. Hei. 10-285586.

SUMMARY OF THE INVENTION

In the method described in Japanese Patent Laid-open No. Hei. 10-285586, a background image and a comparison image are generated. This background image includes only a scene with no moving objects and no left objects, and this comparison image is obtained by removing only the moving objects in processing for comparing input images with the background image. The background image is older than the comparison image on a time axis. A detection area obtained based on a difference between the background image and the comparison image is defined as a stationary object. Whether there is a left object is determined according to the presence of the stationary object.

However, in the above method, a change area is just derived from the background image and comparison image, and a left object itself cannot be recognized. If a plurality of changes occur in the same area, the changes cannot be distinguished individually. When, for example, an left object is placed in front of another left object, these left objects cannot be distinguished. When another object may be left in the area where a missing object has been placed after an object is missed, the missing object and the left object can not be distinctly detected.

In a conceivable method to solve this problem, when a left object is detected, the image data of its area is stored, and the image data obtained from input images is compared with that area so as to determine the presence of a left object and detect changes. When traffic of persons is heavy, the amount of image data by which objects can be referenced is reduced due to moving objects passing between a left object and the camera. Accordingly, the method may affect the discrimination of left objects.

An object of the present invention is to provide a video surveillance equipment and a video surveillance system which can individually detect changes of objects in an area for monitoring a stolen object and a left object, etc. even when the changes occur in the same image area.

The present invention to accomplish the above object is a video surveillance equipment which is provided with an area detecting unit for detecting a second image area nonmoving in a first image area which is a different portion between a reference image being used as a reference in image processing and input images, and a memory medium for storing an image retrieved from the second image area, wherein the images in the second image area included in the input images compares with a stored image over a plurality of times.

According to the present invention, changes of objects in the monitoring area can be individually detected from pictures input from the camera or stored pictures, without being affected by moving objects.

By this method for detecting missing objects and left objects, it is possible to provide a video surveillance equipment which can record left objects and missing objects, issue an alarm when an object is left or missed, and call observer's attention on the display of a monitor.

DETAILED DESCRIPTION OF THE PREFERRED EMBODIMENTS (First Embodiment)

Figure 1:
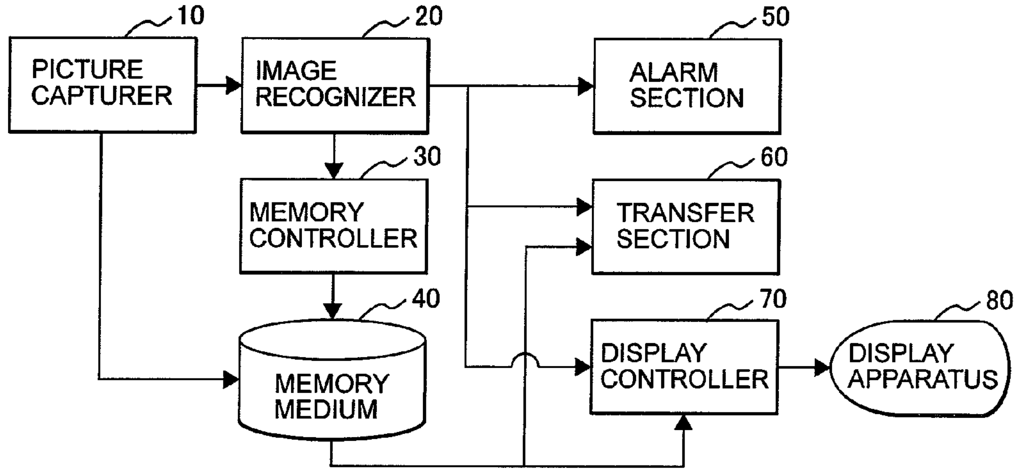
FIG. 1 is a structural diagram showing the overall structure according to an embodiment of the present invention.

An embodiment of the present invention will be described with reference to the drawings. FIG. 1 shows the overall structure of a video surveillance system of the present embodiment. From the viewpoint of hardware, the structure comprises a computer system including a central processing unit (CPU), and its individual functions are executed. The video surveillance system is provided with a picture capturer 10 for capturing signals obtained from one or more imaging devices such as TV cameras as pictures, an image recognizer 20 for recognizing moving objects and left objects by image recognition processing using the image data obtained from the picture capturer 10, a memory controller 30 for controlling the store of pictures and the compression ratio and store interval of recorded pictures based on results calculated by the image recognizer 20, a memory medium 40 for storing the pictures obtained from the picture capturer 10 based on commands from the memory controller 30, an alarm section 50 for issuing an alarm based on a output from the image recognizer 20, a transfer section 60 for transferring information output from the image recognizer 20, information stored in the memory medium 40, etc. to other units installed in the local area and a monitoring center on the network, a display controller 70 for controlling display of the pictures obtained from the picture capturer 10, the information output from the image recognizer 20, and the information stored in the memory medium 40, and a display apparatus 80 for displaying these information. The video surveillance system includes a video surveillance equipment having the picture capturer 10, the image recognizer 20, the memory controller 30, the memory medium 40, the display controller 70 and the display apparatus 80.

The picture capturer 10 captures image data from the camera in real time and image signals received from a picture memory apparatus and the like in which image data is stored, as one-dimensional or two-dimensional array image data. The image data may undergo the preprocessing of smoothing filtering, edge enhancer filtering, image conversion and the like to reduce noise and flicker. A data format such as RGB colors or monochrome may be selected according to the purpose. The image data may also be compressed to a predetermined size to reduce the processing cost.

Figure 2:
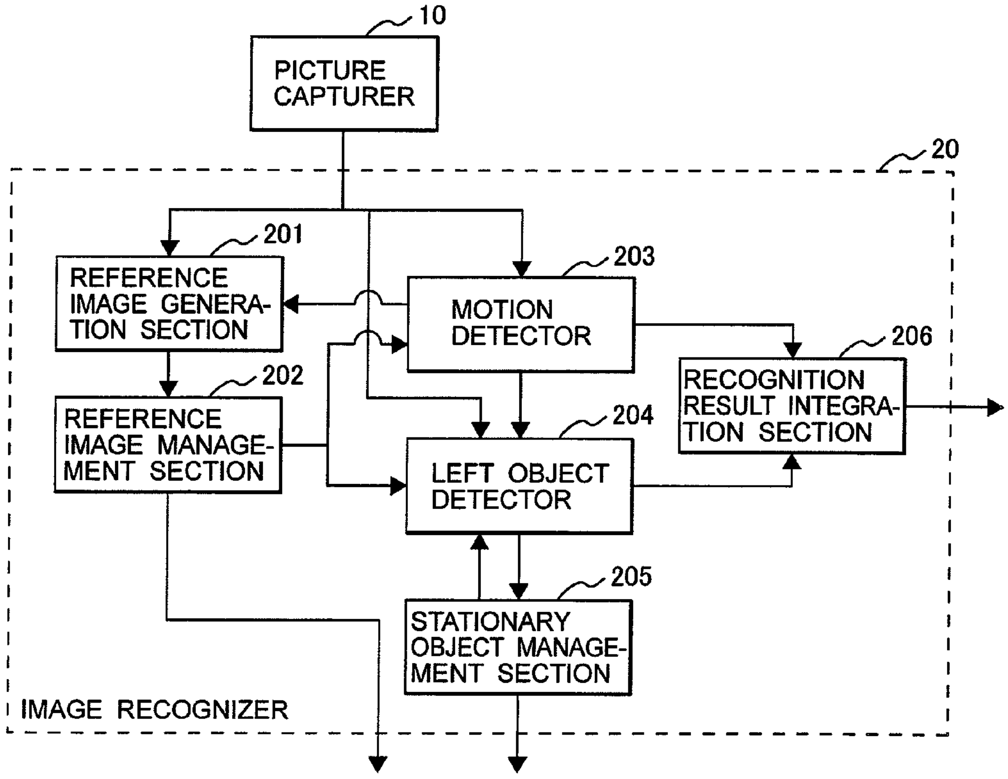
FIG. 2 is an explanatory drawing showing an image recognizer 20 in the embodiment of the present invention.

Next, the image recognizer 20 will be described in detail with reference to FIG. 2. The image recognizer 20 has a reference image generation section 201 for generating a reference image, used as a reference in image recognition processing, based on input images captured by the picture capturer 10; a reference image management section 202 for storing the reference image generated by the reference image generation section 201; a motion detector 203 for detecting a change of a moving object included in the input images by performing comparison operation by an amount of characteristics about the reference image stored in the reference image management section 202 and the input images captured by the picture capturer 10; a stationary object management section 205 for storing information of stationary objects detected by a left object detector 204; the left object detector 204 for detecting left objects by using the input images captured by the picture capturer 10, the reference image stored in the reference image management section 202, and the stationary object images stored in the stationary object management section 205; and a recognition result integration section 206 for integrating the results obtained from the motion detector 203 and left object detector 204 and transferring the integrated result to the memory controller 30, the alarm section 50, the transfer section 60, and the display controller 70. The information stored in the reference image management section 202 and stationary object management section 205 can also be stored in the memory medium 40 and display on the display apparatus 80.

Ideally, the reference image generated by the reference image generation section 201 is an image that adapts to environmental changes such as ever-changing weather conditions and illumination conditions and does not include the moving objects. This is because if the reference image including the moving object is compared with an input image, the moving object included in the reference image may be detected as a change. Furthermore, if the reference image are not followed the environmental changes, a difference in illumination between the reference image and the input image may be detected as a change in brightness. In the present embodiment, therefore, the reference image generation section 201 performs statistical processing on images obtained by removing the effect of a moving object from the input images captured in a set period so as to reconstruct an image excluding the moving object by using information, described later, output from the motion detector 203. The reference image can also be registered by the observer. Accordingly, a reference image, which is free from moving objects and adapt to the environmental changes, can be generated, and the moving objects can be detected with high precision. The reference images generated by the reference image generation section 201 are stored in the reference image management section 202 at set time intervals.

Next, the motion detector 203 will be described. The motion detector 203 carries out comparison processing between the reference image, which is obtained in advance by the reference image generation section 201 and stored in the reference image management section 202, and the input images obtained by the picture capturer 10. Information used in the comparison processing may include a brightness value and RGB values calculated for each pixel of the input images, an amount of characteristics calculated by using arbitrary operators such as edge intensities and directions calculated through a differential filter by using, for example the Sobel operator, or characteristic vectors obtained by the integration of the brightness value, the RGB values and the amount of characteristics. The robustness against environmental changes and detection precision vary with the amount of characteristics, so an amount of characteristics suitable to the situation needs to be set. In the present embodiment, however, brightness values, which are most prevailing, are used. Methods conceivable in the comparison processing include each method of calculation on a per-pixel basis, determination in the local area near a particular pixel, and expansion of a determination criteria in the time axis direction relative to the reference image by use of several frames of input image. In the present embodiment, however, the calculation method based on differential operation on each pixel is used.

A concrete calculation method will be described below. When image data is a two-dimensional array, a pixel position p at arbitrary x and y coordinates is represented as $p=(x, y)$.

The brightness value of the reference image and that of the input image at the pixel position p will be denoted Bp and Ip, respectively. An amount Δp of change between the reference image and the input image at the pixel position p is calculated by Δp=Bp−Ip. When Δp is equal to or greater than a predetermined threshold, the pixel is determined as being included in a moving object. When this determination is carried out over the entire image, the area of the moving object can be extracted.

In processing on a per-pixel basis, however, responses to noise and the like may occur, and thus a false-positive phenomenon may be detected as the area of the moving object or the detected area may include lack of defect areas. Therefore, an area determined as including a moving object undergoes shaping processing such as image processing of the extracted pixels.

Figure 3:
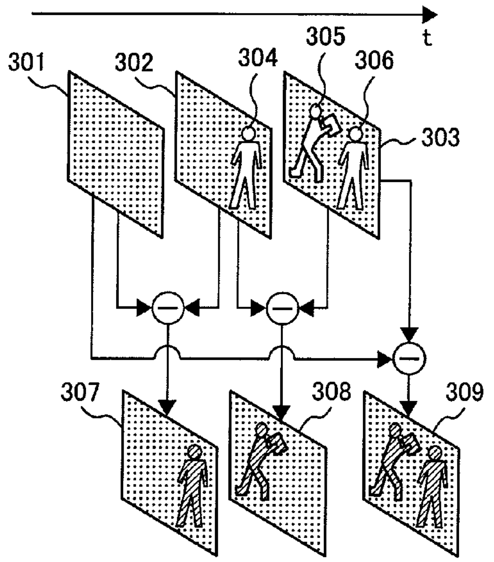
FIG. 3 is a conceptional drawing showing concept of motion determination in the embodiment of the present invention.

In the above motion detection processing, whether the object has stopped cannot be determined. Even when the object has stopped, the reference image management section 202 stores a reference image close to the current time at which processing is performed and subsequent older reference images. Therefore, by making a comparison between the input image and the nearest reference image, it is possible to determine whether the object is stopping or moving, as approximately illustrated in FIG. 3. Image 301 is a reference image and image 302 is an input image including stationary person 304. Image 303 is an input image at the current time, including moving person 305 and stationary person 306. Images 307 to 309 show comparison results. Image 309 is an ordinary image, in which both the moving person and stationary person detected are included, obtained by the moving object detecting processing. When the input image 303 at the current time is compared with the input image 302, which is the closest to the input image 303, the image 308, on which only the moving object is extracted, is obtained. This processing makes it possible to individually detect objects that have entered the monitoring area and are moving or stopping therein and also to determine whether the object is moving or stopping at the current time. By selecting a time used as the reference, it is also possible to determine whether the object is moving or stopping at that time.

Figure 4:
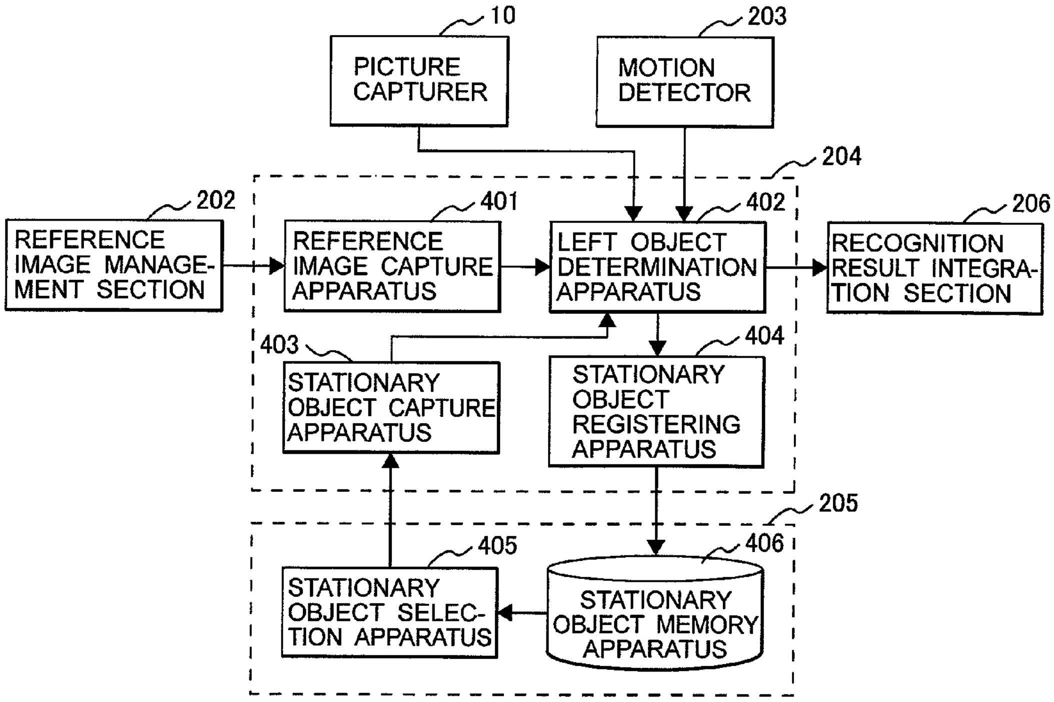
FIG. 4 is an explanatory drawing showing a left object detector 204 in detail in the embodiment of the present invention.

Next, the left object detector 204, which is the most basic part in the video surveillance system, will be described with reference to FIG. 4. In the left object detector 204, a left object determination apparatus 402 first determines the stopping state of the object included in the input image by using the moving object and/or the stopping object obtained by the motion detector 203. A stationary object registering apparatus 404 acquires object data concerning an object that has been stopping for a predetermined time and stores the acquired object data in a stationary object memory apparatus 406. The stationary object memory apparatus 406 stores object data such as the coordinates of the area of the stationary object, the image data or the amount of characteristics obtained from the image data, a time when the stop began, a stopping period, and the like in a predetermined data structure. It is also possible to store the object data in the memory medium 40 through the memory controller 30. The object data is output in response to a request from a stationary object selection apparatus 405 and a stationary object capture apparatus 403. A reference image capture apparatus 401 captures the reference image stored in the reference image management section 202. The left object determination apparatus 402 determines whether there is a left object by using the stationary object data, the reference image, and the input images captured by the picture capturer 10.

Processing that are performed by the left object determination apparatus 402 will be described in detail with reference to FIG. 5. The motion detector 203 has acquired stationary object data (R52) from an area determined as including a stationary object. Image data (R53) in the area in which the stationary object is included is extracted from the input image (S51). Now, processing will be considered in which the left object determination apparatus 402 performs comparison operation on the stationary object data R52 and the image data R53 of the input image and determine whether the object is still present.

Comparisons that can be carried out in the comparison operation of the images include comparison of spatial brightness distributions on the images by a correlation method or analysis of spectrum, comparison of geometrical structures including edges, outlines, textures, and corner points, and comparison between images based on the degree of similarity got by comparison of characteristics obtained by other operators. Although various types of pattern matching methods are applicable in these comparison operations, the comparison operation which is performed in the left object determination apparatus 402 uses the SAD (sum of absolute differences), which is the most simple.

In the SAD method, the brightness value of a template image (here, which is the left object data) at the pixel position p is denoted Tp, and the brightness value of the input image at the pixel position p is denoted Ip. When the total number of pixels in the image data be M, a degree of similarity S is then calculated by, for example, $S=\Sigma|Tp-IP|/M$. This degree S of similarity can be used to determine the degree of similarity of the image data.

Figure 6:
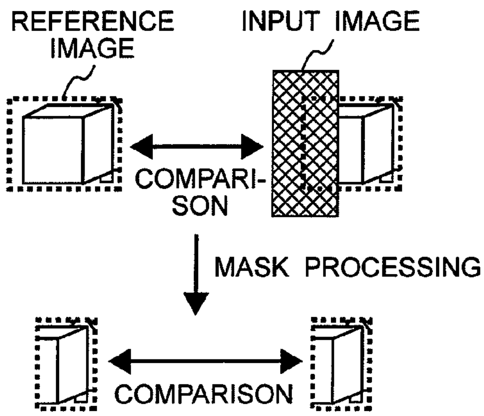
FIG. 6 is a conceptional drawing showing a mask processing in a left object determination method in the embodiment of the present invention.

When a moving object appears between the left object and the camera, exception values are also included in the area of the stationary object obtained from the input image, together with the image data R53. Therefor, the degree of similarity in the SAD method is reduced. To solve this problem, when the effect of the moving object is reduced in the determination as to the presence of a moving object, information about the motion area obtained by the motion detector 203 is used to perform mask processing for the motion area. FIG. 6 illustrates an example of comparison between the template image and an input image after mask processing has been performed on these images. The mask processing means processing to remove part of data in a data array.

Mask processing is performed on both the stationary object data R52 and the image data R53 of the input image. When SAD is executed for the remaining area, for which the mask processing is not performed, the motion area does not serve as a factor to reduce the degree of similarity.

However, when the motion area is removed, the amount of data to reference is reduced. This may reduce the reliability of the degree of the similarity. Even when there is a left object, determination of the degree of the similarity based on a fixed threshold may cause a mismatch. Accordingly, on the reference image, comparison operation is also performed between the stationary object and the image data (R51) in the same area.

As in the method described above, the stationary object data (R52), and the image data (R51) of the reference image are acquired (S51), and mask processing is performed for the motion area to derive degree of a similarity on the basis of SAD. The degree of similarity between the stationary object data (R52) and the image data (R51) of the reference image is derived by a reference image similarity degree calculation apparatus 501, and the degree of similarity between the stationary object data (R52) and the input image is derived by an input image similarity degree calculation apparatus 502. A similarity degree comparison apparatus 503 compares the two similarity degrees; when the degree of the similarity with the input image is higher, it is determined that a left object exists; when the degree of the similarity with the reference image is higher, it is determined that there is no left object.

The reliability of the degree of similarity with the input image is determined according to the dimensions of the stationary object data on which mask processing has been performed. If the dimensions are smaller than a predetermined threshold, the amount of referenceable data is small, lowering the reliability of the degree of similarity with the input image. In this case, pattern matching with the reference image is also performed and then the similarity degree comparison apparatus 503 determines the presence of an object. This pattern matching processing increases the accuracy of the determination as to whether an object is left. If the dimensions of the stationary object data on which mask processing has been performed are greater the predetermined threshold, the reliability of the degree of similarity with the input image is high, so the degree of similarity with the input image is used to determine whether there is an object. This processing enables the computational cost to be reduced while the precision of determination as to whether there is an object is maintained, as compared with the method of determining the presence of an object by the similarity degree comparison apparatus 503.

Figure 7:
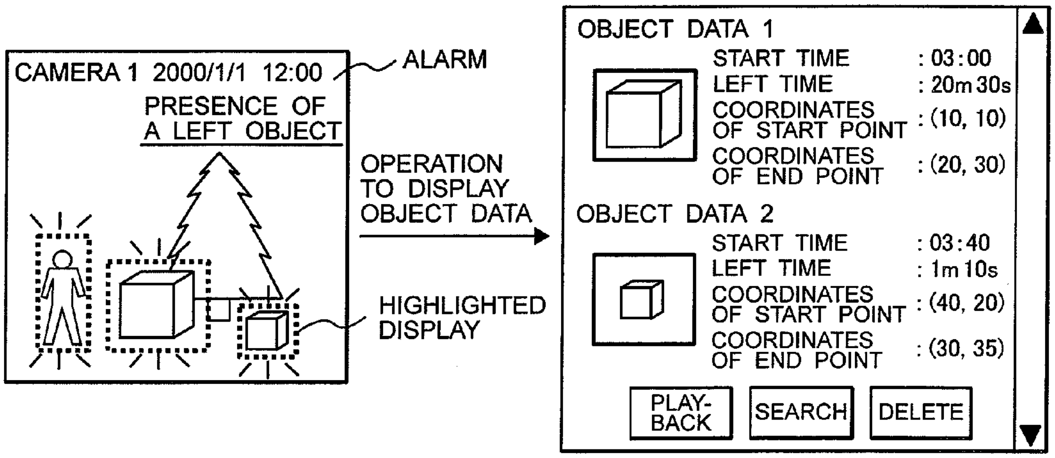
FIG. 7 is an explanatory drawing showing an example of display method of left object data in the embodiment of the present invention.

FIG. 7 shows an example of an output displayed on the display section 80. The area determined as including a left object is highlighted. When there are a plurality of objects, they are distinguished by, for example, displaying them in different colors. When a moving object is also included, it is displayed as distinguished from the left objects. To call observer's attention, it is also possible to display an alarm to indicate whether there are the left objects. When the screen is switched to an object data display screen, an object image, a left period, a time when the left state began, the coordinates of an object area, and the like can be seen for each object. In addition, an image in a part where on object is left can be reproduced, object data near a specified time can be displayed as a search function, and data of objects for which confirmation of the objects has been completed can be deleted.

So far, the description has been focused on detection of left objects. When an image including an object to be monitored is set as a reference image, missing of the object in the monitoring area can also be detected. If the object is missed in the monitoring area, since the image in the area in which the object has been present before being missed changes, the motion detector 203 determines that the remaining object is a stationary object. Since there is no motion in the changed area, missing of the object can also be detected as in detection of a left object.

In the image processing method in the present embodiment, the image data of a stationary object image is compared with an input image and reference image, so changes caused in the stationary object can also be detected. Specifically, deformation, damage, and other changes caused in the area of the stationary object can be detected.

(Second Embodiment)

Figure 8:
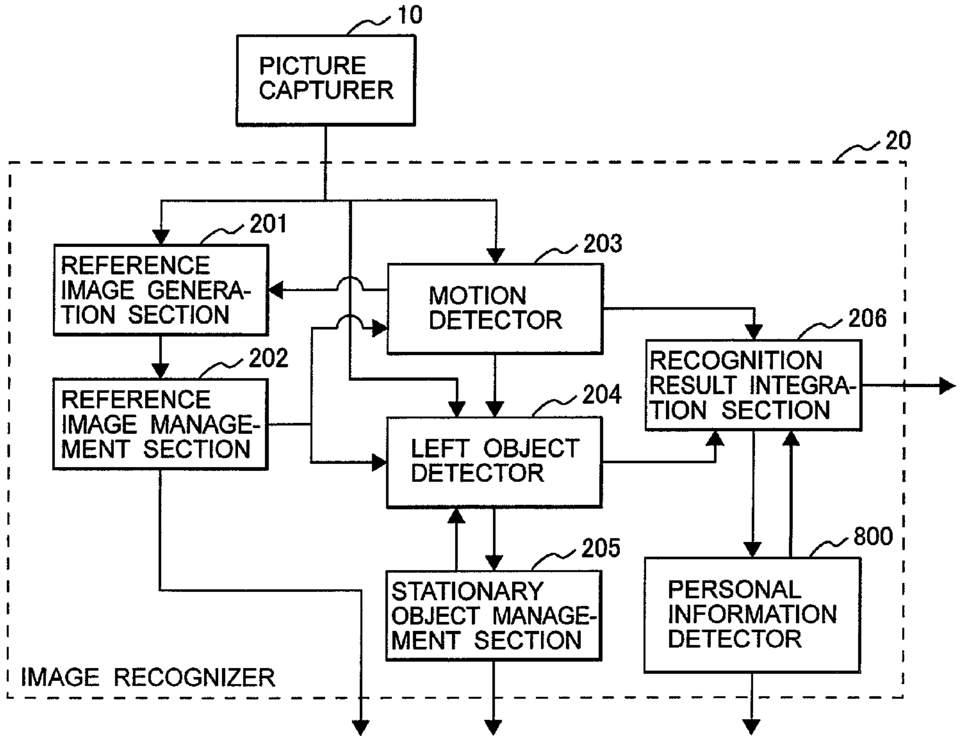
FIG. 8 is an explanatory drawing showing an application example in another embodiment, in which a personal information detector is added, of the present invention.

A video surveillance system of second embodiment, in which an arrangement for acquiring information about a face, clothes, and the like is added to the video surveillance system of the first embodiment, will be described with reference to FIG. 8. The information obtained by the motion detector 203 and the information obtained by the left object detector 204 is input in the recognition result integration section 206. A personal information detector 800 can extract, from these input information, data about a person near a left object at the time when the object was left so as to implement a function to store, transfer, or display the extracted personal data. Specifically, an area determined as including a person based on the results of face detection processing, head detection processing, size decision, and the like is extracted from an area determined by the motion detector 203 as including a motion, and the picture information about the extracted area is then stored in the memory medium 40 or the like.

Figure 9:
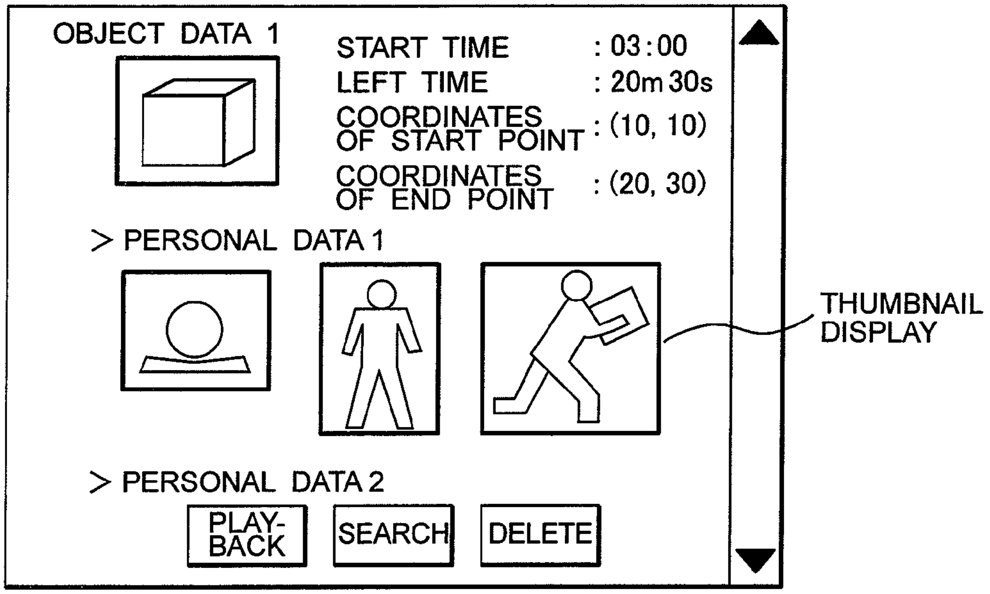
FIG. 9 is an explanatory drawing showing an example of display method of personal information accompanying object information according to the above another embodiment of the present invention.

FIG. 9 illustrates an example of information displayed in the second embodiment. Object data is selected from data of the left objects that were detected. Thumbnails of face data, an entire person image, and the like can be displayed as personal data before and after a time at which the object corresponding to the selected object data was left.

(Third Embodiment)

Figure 10:
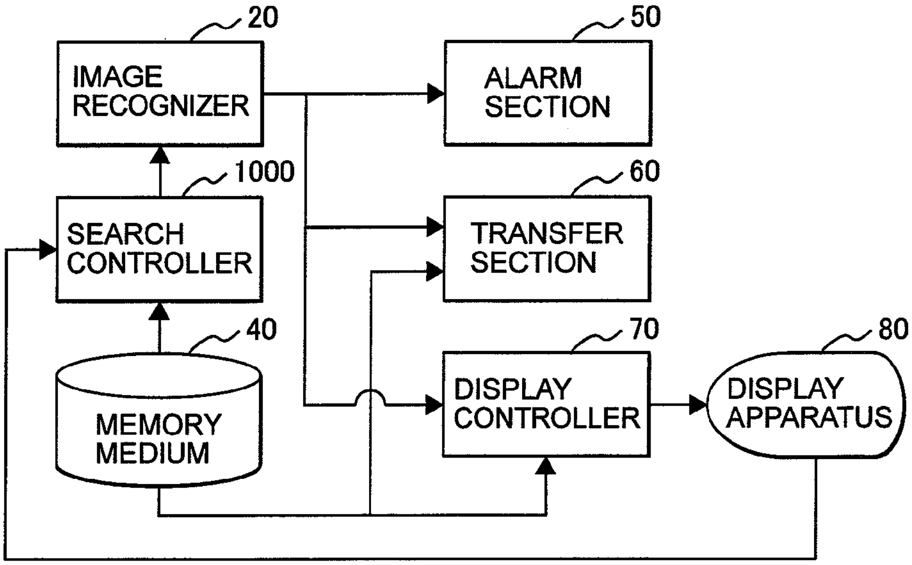
FIG. 10 is a structural diagram showing the overall structure acceding to a still another embodiment of the present invention.

In the left object detection method of the present invention described in the first embodiment, pictures input to the image recognizer 20 may be picture data already stored in the memory medium 40. That is, a function to search for the stored pictures can be implemented. FIG. 10 shows a video surveillance system, in which the function is implemented, of third embodiment. The video surveillance system of third embodiment arranges a search controller 1000 between the memory medium 40 and the image recognizer 20. An object to be searched for from a human interface is specified on the display section 80. In a case where this video surveillance system is used in state that detection of left objects is not set, the video surveillance system can use to check pictures on which such an object is set when a suspicious left object may be found later.

Figure 11:
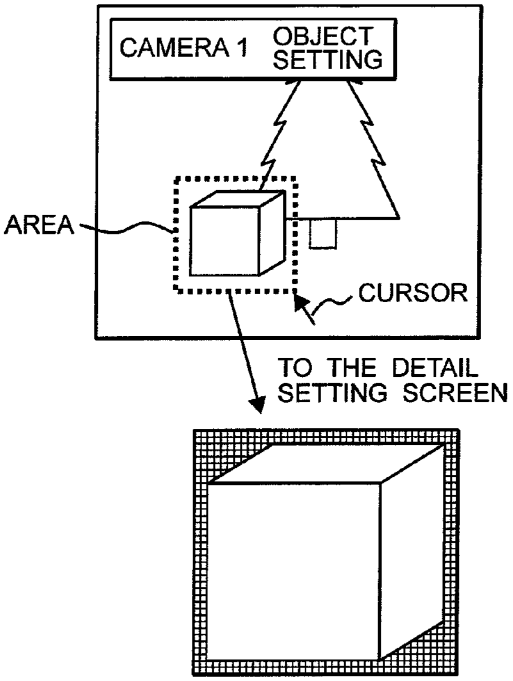
FIG. 11 is an explanatory drawing showing an example of a screen being used search of an object acceding to the still another embodiment of the present invention.

FIG. 11 illustrates how to specify an object. An area of an object can be set by specifying an upper left corner thereof as the start point and a lower right corner as the end point through a graphical user interface (GUI) with a mouse or from an operation panel supplied with a device. When an area is set, an object needs to be set in detail. To respond to this, a detailed area setting screen is popped up as an enlarged screen.

Figure 12:
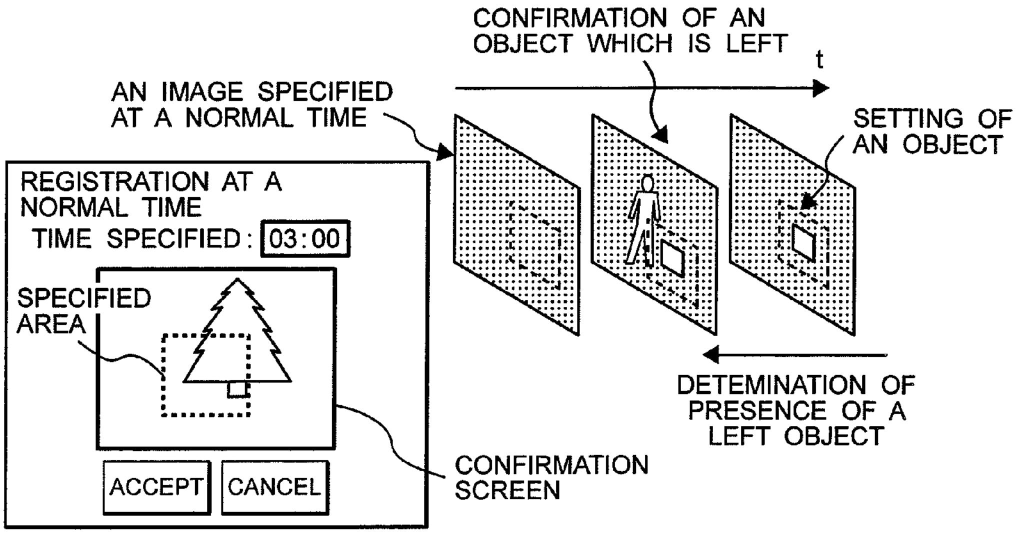
FIG. 12 is an explanatory drawing showing an example of a registration screen at a normal time when a search is made acceding to the still another embodiment of the present invention.

FIG. 12 illustrates processing in the present embodiment. First, the user selects a left object to be searched for, as described above. Then, the user specifies a normal time and the picture at that time. For example, it suffices to use a setting screen as shown in FIG. 12. After the area is set, processing similar to processing by the left object determination apparatus 402, in which the set image data is substituted for the left object data R51 in FIG. 5, is performed, and pictures are traced, starting from the picture at the current time and going back. Whether there is an object is determined in this processing. The picture at the time when the object disappeared, that is, the picture immediately before the object is set can then be searched for.

Some applications of the method of the third embodiment can be considered. A cashbox, jewel, or other important object is set through a human interface, and object data is acquired. Degrees of similarity between the important object data and the input images and between the important object data and the reference image are derived to determine whether the object is present, implementing an important object watching function. When the similarity degree derived by the input image similarity degree calculation apparatus 502 in FIG. 5 falls to or below a predetermined value, it is considered that a change occurred for the important object. Accordingly, a system that detects damage to important objects and specified objects and the missing of these objects with superior accuracy can be implemented.

Figure 13:
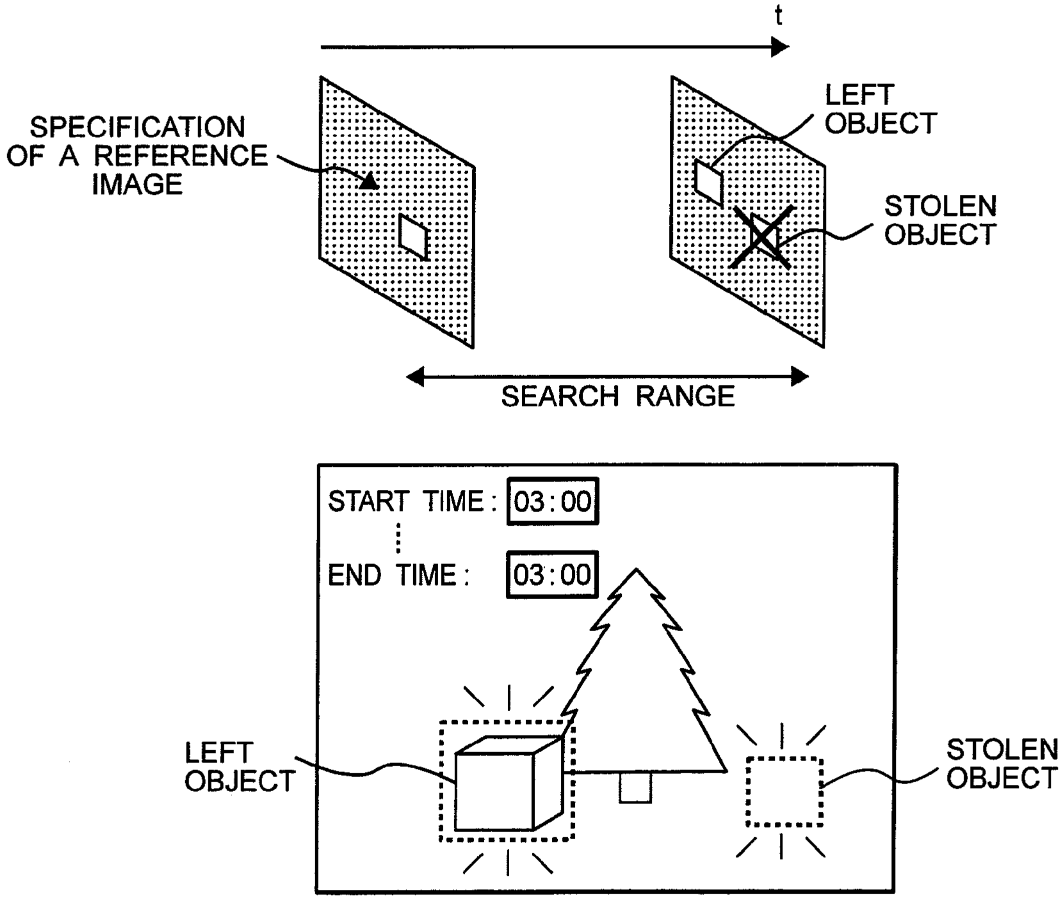
FIG. 13 is a conceptional drawing showing the concept of recognizing a left object and a missing object from a reference image acceding to a still another embodiment of the present invention.

Furthermore, the method in which a normal time is specified can be applied to implement a monitoring system for detecting left and missing objects, as illustrated in FIG. 13. Specifically, the user specifies a reference image used as a reference and a search range. Comparison with the reference image is made within the search range in the order of time or the reverse order so as to recognize a left or missing object.

Figure 5:
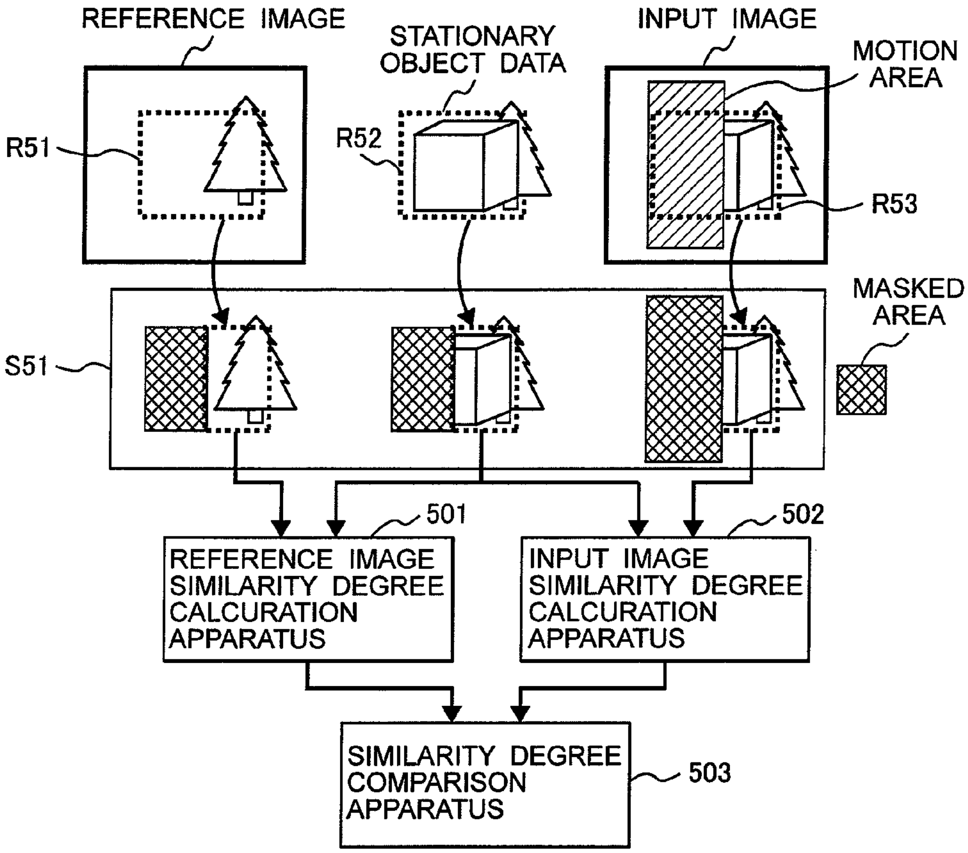
FIG. 5 is an explanatory drawing showing a left object determination method in the embodiment of the present invention.

In the above image processing method, in which an area of an object is specified from the operation panel and processing similar to processing by the left object determination apparatus 402, in which a specified image data is substituted for the left object data R51 in FIG. 5, is performed, it is possible not only to detect damage to a specified object searched for from stored pictures or the missing of the specified object as in the third embodiment, but also to detect the damage to or the missing of the specified object directly from input images as in the first embodiment.

The transfer section 60, shown in FIGS. 1 and 10, in the individual embodiments transfers an image of object data, a left period, a time when the left state began, the coordinates of an object area, personal data, and other information to the monitoring center through a network. The monitoring center then sends necessary information to a mobile telephone or another mobile terminal or distributes the personal data as a person for which warning should be taken.

The present invention includes a program that implements the left object recognition method on a computer.

What is claimed is:

1. A video surveillance equipment for detecting change of an object in a monitoring area based on input images captured by a picture capturer, the equipment comprising:

a reference image generation section for generating a reference image, which is a reference in image recognition processing, based on the input captured by the picture capturer;

a motion detection apparatus for detecting motion of an object existing in the input images by comparing the input images with the reference image, and for determining a moving state of the object management section for storing information of a stationary object; and a left object detector for determining a stopping stat of the object based on the determination result of moving state of the object in the motion detection apparatus, and storing the information of the stationary object that is the object stopping for a predetermined time in the stationary object management section;

wherein the left object detector includes:

a masked image generation section for generating a first masked image of the stationary object in which a motion region obtained by the motion detection apparatus and included in the image of the stationary object is masked, and a second masked image of the input image in which the motion region included the input image is masked;

a first similarity degree calculation apparatus for calculating a first similarity degree between the first masked image and the second masked image; and an object change detection apparatus for detecting the motion of the object in the monitoring area based on the first similarity degree;

wherein the left object detector includes:

the masked image generation section for generating a third masked image of the reference image in which the motion region included the reference image is masked;

a second similarity degree calculation apparatus for calculating a second similarity degree between the first masked image and the third masked image; and a comparison result integration apparatus that is the object change detection apparatus for detecting the motion of the object in the monitoring area based on a comparison result between the first similarity degree obtained by the first similarity degree calculation apparatus and the second similarity degree obtained by the second similarity degree calculation apparatus; and wherein the detection of the motion of the object in the monitoring area is performed based on a comparison result between the first similarity degree and the second similarity degree; and the first similarity degree when an amount of data of the image in the motion region obtained by the motion detection apparatus is larger than a predetermined amount, and based on the comparison result between the first similarity degree and the second similarity degree when the amount of the data of the image in the motion region is smaller than the predetermined amount.

2. The video surveillance equipment according to claim 1, further comprising:

a personal information detection apparatus for acquiring characteristics information of a person image existing near an aera in which the stationary object is stopped at a time when the stationary object is stopped.

3. The video surveillance equipment according to claim 2, further comprising:

a display apparatus for displaying at least one information of a time at which the change of the input image is detected, the input image, an image in the input.

4. A video surveillance system, comprising:

a video surveillance equipment including a reference image generation section for generating a reference image, which is a reference in image recognition processing, based on the input images captured by the picture capturer; a motion detection apparatus for detecting motion of an object existing in the input images by performing comparison of the input images with the reference image, and for determining a moving state of the object;

a stationary object management section for storing information of a stationary object; a left object detector for determining a stopping stat of the object based on the determination result of moving state of the object in the motion detection apparatus, and storing the information of the stationary object that is the object stopping for a predetermined time in the stationary object management section;

a personal information detection apparatus for acquiring characteristics information of a person image existing near an area in which the stationary object is stopped at a time when the stationary object is stopped;

a display apparatus for displaying at least one information of a time at which the change of the specific image is detected, the specific image, an image in the specified image area after the change of the specified image is detected, coordinates of an area including the change in the specified image area of the specified image, and the person image;

a transfer apparatus for outputting the at least one information being displayed on the display apparatus; and an unit for inputting the at least one information output from the transfer apparatus through a network, wherein the left object detector has a masked image generation section for generating a first masked image of the stationary object in which a motion region obtained by the motion detection apparatus and included in the image of the stationary object is masked, and a second masked image of the input image in which the motion region included the input image is masked;

a first similarity degree calculation apparatus for calculating a first similarity degree between the first masked image and the second masked image; and an object change detection apparatus for detecting the motion of the object in the monitoring area based on the first similarity degree;

wherein the left object detector includes:

the masked image generation section for generating a third masked image of the reference image in which the motion region included the reference image is masked;

a second similarity degree calculation apparatus for calculating a second similarity degree between the first masked image and the third masked image; and a comparison result integration apparatus that is the object change detection apparatus for detecting the motion of the object in the monitoring area based on a comparison result between the first similarity degree obtained by the first similarity degree calculation apparatus and the second similarity degree obtained by the second similarity degree calculation apparatus; and wherein the detection of the motion of the object in the monitoring area is performed based on a comparison result between the first similarity degree and the second similarity degree; and the first similarity degree when an amount of data of the image in the motion region obtained by the motion detection apparatus is larger than a predetermined amount, and based on the comparison result between the first similarity degree and the second similarity degree when the amount of the data of the image in the motion region is smaller than the predetermined amount.

5. A method of processing an image for detecting change of an object in a monitoring area based on input images captured by a picture capturer, the method comprising:

generating a reference image, which is a reference in image recognition processing, based on the input images captured by the picture capturer in a reference image management section;

detecting motion of an object existing in the input images by performing comparison of the input images with the reference image, and determining a moving state of the object in a motion detection apparatus;

storing information of a stationary object in a stationary object management section;

determining a stopping state of the object based on the determination result of moving state of the object in the motion detection apparatus by a left object detector, and storing the information of the stationary object that is the object stopping for a predetermined time in the stationary object management section by the left object detector;

wherein the left object detector generates a first masked image of the stationary object in which a motion region obtained by the motion detection apparatus and included in the image of the stationary object is masked, and a second masked image of the input image in which the motion region included the input image is masked: calculates a first similarity degree between the first masked image and the second masked image; and detects the motion of the object in the monitoring area based on the first similarity degree;

wherein the left object detector generates a third masked image of the reference image in which the motion region included the reference image is masked; and calculates a second similarity degree between the first masked image and the third masked image;

wherein the detection of the motion of the object in the monitoring area is performed based on a comparison result between the first similarity degree and the second similarity degree; and the first similarity degree when an amount of data of the image in the motion region obtained by the motion detection apparatus is larger than a predetermined amount, and based on the comparison result between the first similarity degree and the second similarity degree when the amount of the data of the image in the motion region is smaller than the predetermined amount.

6. The method of processing an image according to claim 5, comprising:

acquiring characteristics information of a person image existing near an area in which the stationary object is stopped at a time when the stationary object is stopped, by a personal information detection apparatus.

7. The method of processing an image according to claim 5, comprising: displaying at least one information of a time at which the change of the input image is detected, the input image, an image in the input image area after the change of the input image is detected, coordinates of an area including the change in the input image, and the person image, on a display apparatus.

* * * * *